United States Patent
Lazarev et al.

(10) Patent No.: US 7,166,161 B2
(45) Date of Patent: *Jan. 23, 2007

(54) ANISOTROPIC FILM MANUFACTURING

(75) Inventors: Pavel I. Lazarev, Belmont, CA (US);
Victor V. Nazarov, Moscow region (RU)

(73) Assignee: Nitto Denko Corporation, Osaka (JP)

( * ) Notice: Subject to any disclaimer, the term of this patent is extended or adjusted under 35 U.S.C. 154(b) by 94 days.

This patent is subject to a terminal disclaimer.

(21) Appl. No.: 10/685,930

(22) Filed: Oct. 14, 2003

(65) Prior Publication Data

US 2004/0142183 A1 Jul. 22, 2004

Related U.S. Application Data

(60) Provisional application No. 60/440,939, filed on Jan. 17, 2003.

(51) Int. Cl.
*C30B 29/54* (2006.01)

(52) U.S. Cl. .............................. 117/4; 117/68; 117/925; 117/926; 117/927

(58) Field of Classification Search .................... 117/4, 117/68, 925, 926, 927
See application file for complete search history.

(56) References Cited

U.S. PATENT DOCUMENTS

| | | | |
|---|---|---|---|
| 4,016,331 A | 4/1977 | Garito et al. | |
| 4,940,854 A | 7/1990 | Debe | |
| 5,176,786 A | 1/1993 | Debe | |
| 5,596,434 A | 1/1997 | Walba et al. | |
| 5,646,284 A | 7/1997 | Usuki et al. | |
| 5,656,751 A | 8/1997 | Tanaka et al. | |
| 5,710,273 A | 1/1998 | Usuki et al. | |
| 5,739,296 A | 4/1998 | Gvon et al. | |
| 6,049,428 A | 4/2000 | Khan et al. | |

(Continued)

FOREIGN PATENT DOCUMENTS

EP 0 352 931 B1 10/1993

(Continued)

OTHER PUBLICATIONS

Albright, L.F., et al., *Pyrolysis Theory and Industrial Practice*, Academic Press (1983). (not included).

(Continued)

*Primary Examiner*—Robert Kunemund
(74) *Attorney, Agent, or Firm*—Dorsey & Whitney LLP

(57) ABSTRACT

The present invention relates to an anisotropic films and method for obtaining the same. The film comprises substrate and at least one modified conjugated aromatic crystalline layer deposited onto said substrate. The said layer is characterized by globally ordered crystalline structure with intermolecular spacing of 3.4±0.3 Å along one of optical axes. The modified conjugated aromatic crystalline layer is formed by rodlike supramolecules, which comprise at least one polycyclic organic compound with conjugated π-system. At least part of the modified conjugated aromatic crystalline layer has electric conductivity and is slightly soluble or insoluble in polar solvents. The films are useful in optical applications, such as polarizers and retarders, and in electronic and light emitting devices, such as fiber optics modulators and switches, solar cells, charge-coupled device (CCD), thin film transistor integrated circuits, light emitting diodes, and light emitting displays. The invention features the use of organic compounds for manufacturing thin crystal films useful in various applications.

43 Claims, 8 Drawing Sheets

U.S. PATENT DOCUMENTS

| | | | |
|---|---|---|---|
| 6,411,354 B1 | 6/2002 | Lavrentovich et al. | |
| 6,673,398 B2* | 1/2004 | Schneider et al. | 428/1.2 |
| 6,692,699 B2* | 2/2004 | Abbott et al. | 422/82.05 |
| 2002/0055093 A1* | 5/2002 | Abbott et al. | 435/5 |
| 2002/0167632 A1 | 11/2002 | Lavrentovich et al. | |
| 2002/0168511 A1 | 11/2002 | Schneider et al. | |
| 2004/0067324 A1* | 4/2004 | Lazarev et al. | 428/1.31 |
| 2004/0224182 A1* | 11/2004 | Lazarev | 428/690 |
| 2004/0256615 A1* | 12/2004 | Sirringhaus et al. | 257/40 |
| 2004/0263739 A1* | 12/2004 | Sirringhaus et al. | 349/135 |
| 2005/0103258 A1* | 5/2005 | Lazarev | 117/89 |
| 2005/0146671 A1* | 7/2005 | Khavrounyak et al. | 349/182 |

FOREIGN PATENT DOCUMENTS

| | | |
|---|---|---|
| EP | 0 659 865 A1 | 6/1995 |

OTHER PUBLICATIONS

Ashida, Michio et al., "Unit Cell Metastable-form Constants of Various Phthalocyanines", *Bull. Chem. Soc. Jpn.*, vol. 39, No. 12 (1966), pp. 2616-2624.

Ashida, Michio, "The Orientation Overgrowth of Metal-phthalocyanines on the Surface of Single Crystals. I. Vacuum-condensed Films on Muscovite, II. Vacuum-condensed Films of Copper-phthalocyanine on Alkali Halides", *Bull. Chem. Soc. Jpn.*, vol. 39, No. 12 (1966), pp. 2625-2631, 2632-2638.

Ashida, M. et al., "Thermal transformation of vacuum-condensed thin films of copper-phthalocyanine", *J. Crystal Growth*, 8 (1971), pp. 45-56.

Bobrov, Y, "Spectral properties of thin crystal film polarizers", *Molecular Materials*, vol. 14, No. 3 (2001), pp. 191-203.

Brown, R.F.C., *Pyrolytic Methods in Organic Chemistry*, New York (1980). (not included).

Buehler, C.A., et al., *Survey of Organic Syntheses*, Wiley-Interscience, New York (1970). (not included).

Cram, D. J. et al., "Room temperature Wolff-Kishner reduction and Cope elimination reactions", *J. Am. Chem Soc.*, vol. 84 (1962), pp. 1734-1735.

*Encyclopedia of Chemistry*, McGraw-Hill, New York (1983), pp. 14-15.

Fryer, J.R., "Molecular Images of Thin-Film Polymorphs and Phase Transformations in Metal-Free Phthalocyanine", *Acta Cryst.*, (1979), A35, pp. 327-332.

Haubenreisser, W., et al., "Microscopic Theory of the Growth of Two-Component Crystals", Ed. A.A. Chernov, *Modern Theory of Crystal Growth*, Springer-Verlag, N.Y. (1983), Chapter 9, 43-41. (not included).

Jung, Woo-Chan et al., "Synthesis of Intercalation Compounds between a Layered Double Hydroxide and an Anionic Dye", *Bull. Korean Chem. Soc.*, 17 (1996), pp. 547-550.

Kepler, R. G. et al., "Electron and hole mobility in *tris* (8-hydroxyquinolinolato-N1,O8) aluminum", *Appl. Phys. Lett*, vol. 66, Jun. 26, 1995, pp. 3618-3620.

Kinbsbury, Charles A. et al., "Studies in Stereochemistry. XXXII. Mechanism of Elimination of Sulfoxides", *J. Am. Chem. Soc.*, vol. 82, 1960, pp. 1810-1819.

Koma, A., "Molecular Beam Epitaxial Growth of Organic Thin Films", *Prog. Crystal Growth and Charaact.*, vol. 30, 1995, pp. 129-152.

Lazarev, P., et al., "X-ray Diffraction by Large Area Organic Crystalline Nano-films", *Molecular Materials*, vol., 14, No. 4, 2001, pp. 303-311.

Lydon, J., "Chromonics", *Handbook of Liquid Crystals* (Weinheim, Wiley, 1998), vol. 2B, pp. 981-1007.

McPherson, Alexander, "Facilitation of the Growth of Protein Crystals by Heterogeneous/Epitaxial Nucleation", *J. Cryst. Growth*, vol. 85, 1988, pp. 206-214.

Morrison, R., et al., *Organic Chemistry*, Publishing house "Mir", Moscow, 1974, Chapters 35 and 36, in Russian. (not included).

Murata, Y. et al., "Molecular image of copper phthalocyanine", *J. Microsc.*, vol. 108, Pt., 3, Dec. 1976, pp. 261-275.

Saijo, H. et al., "Epitaxial growth of a new polymorph of Cu-phthalocyanine on graphile". *J. Crystal Growth*, vol. 40 (1977), pp. 118-124.

Saito, Yoshio et al., "Molecular energetics of the epitaxial growth of chlorinated copper phthalocyanine on KC1 surfaces", *J. Crystal Growth*, vol. 67 (1984), pp. 91-96.

Saito, Yoshio et al., "Epitaxial growth mechanism of chlorinated copper phthalocyanine on KCI surfaces", *Appl. Surf. Sci.*, 22/23 (1985), pp. 574-581.

Sergan, Tatiana et al., "Polarizing-alignment layers for twisted nematic cells", *Liquid Cryst.*, vol. 27, No. 5 (2000), 567-572.

Uyeda, Natsu et al., "Molecular image resolution in electron microscopy", *J. App. Phys.*, vol. 43, No. 12, Dec. 1972, pp. 5181-5189.

Vanselow, R., et al., Eds, *Chemistry and Physics of Solid Surfaces V*, Springer-Verlag, N.Y., 1984, pp. 365-401.

Walling, Cheves et al., "The Addition of Dimethyl Sulfoxide Anion to Olefins and the Pyrolysis of Sulfoxides", *Org. Chem.*, vol. 29, Sep. 1964, pp. 2699-2701.

Williams, Jonathan W. et al., "An improved apparatus for the laboratory preparation of ketene and butadiene", *J. Org. Chem.*, vol. 5 (1940), pp. 122-125.

* cited by examiner

ANISOTROPIC FILM MANUFACTURING

CROSS REFERENCE TO RELATED APPLICATIONS

This application claims the benefit of the priority of U.S. Provisional Patent Application No. 60/440,939 filed Jan. 17, 2003, the disclosure of which is hereby incorporated by reference in its entirety.

FIELD OF THE INVENTION

The present invention relates to anisotropic films of organic aromatic compounds with flat, disk-shaped molecular structure (discotic molecules) that are useful in optical applications, such as polarizers and retarders, and in electronic and light emitting devices, such as fiber optics modulators and switches, solar cells, charge-coupled device (CCD), thin film transistor integrated circuits, organic light emitting diodes, and light emitting displays.

The invention features the use of organic compounds for manufacturing thin anisotropic crystal films useful in various applications.

BACKGROUND OF THE INVENTION

The state of the art in oriented crystalline film manufacturing is known as epitaxial growth. The epitaxial growth of single crystal films of inorganic materials on inorganic substrates is widely used in modern semiconductor technology. There are two basically different processes: gas- or vapor-phase epitaxy (VPE), where thin layers are deposited onto substrates from gas or vapor mixtures, and liquid-phase epitaxy (LPE), where the growth proceeds from liquid solutions or melts. It must be noted that epitaxial growth requires using crystalline substrate with parameters of the crystal unit cell matched with that of the growing thin crystal film. In this case, the crystal structure repeats that of the substrate and the anisotropy of the physical properties of such films is determined by the type of the crystal lattice of the semiconductor material employed [see: Recent Developments in the Theory of Epitaxy, J. H. van der Merwe, in Chemistry and Physics of Solid Surfaces V, Eds. R. Vanselow and R. Howe, Springer-Verlag, N.Y. (1984), p. 365–401, and Growth from the Vapor Phase, in Modern Theory of Crystal Growth I, Ed. A. A. Chemov, Springer-Verlag, N.Y. 1983, Ch. 9].

There is a known method for the epitaxial growth of thin layers composed of large anisotropic organic molecules on inorganic substrates. According to this, the deposition process or mass transfer is produced via a VPE process in a vacuum chamber. This VPE technique was used to obtain the layers of organic molecules on graphite, alkali halide, and some other materials. [see: N. Uyeda, T. Kobayashi, E. Suito, Y. Harada and M. Watanabe, J. Appl. Phys. 43(12), 5181 (1972); M. Ashida, Bull. Chem. Soc. Jpn. 39(12), 2625–2631, 2632–2638 (1966); H. Saijo, T. Kobayashi and N. Uyeda, J. Crystal Growth 40 118–124 (1977); M. Ashida, N. Uyeda and E. Suito, J. of Crystal Growth 8, 45–56 (1971); Y. Murata, J. R. Fryer and T. Baird, J. Microsc., 108(3), 261–275 (1976); J. R. Fryer, Acta Cryst. A35, 327–332 (1979); M. Ashida, N. Uyeda and E. Suito, Bull. Chem. Soc. Jpn. 39(12), 2616–2624 (1966); Y. Saito and M. Shiojiri, J. Crystal Growth 67, 91 (1984); and Y. Saito, Appl. Surf. Sci. 22/23, 574–581 (1985)].

Also known are the methods for epitaxial growth and polymerization of synthetic polymers and biopolymers on alkali metals halide substrates from solutions, melts, and vapor phase. There are examples of using other inorganic minerals as substrates [see. A. McPherson and P. J. Schlichto, J. Cryst. Growth 85, 206 (1988)].

There are several disadvantages inherent in inorganic single crystals, which limit the possibilities of using such crystals as substrates for epitaxial growth. In particular, the number of single crystal materials suited for epitaxial growth is rather restricted because the crystal surface can be reactive, and/or covered with oxides, and/or contain adsorbed water molecules. The substrate can be nontransparent, possess undesired electronic and/or thermal properties, and so on. The major restriction is based on the requirement of coinciding or co-dimensioning crystal lattices of substrate and growing crystal film. Another restriction is the size of single crystal substrate that is available for reasonable cost. Most of single crystals are produced in limited sizes and at high expense.

There is a known method for the molecular beam epitaxial growth of organic thin films [A. Korna, Molecular Beam Epitaxial Growth of Organic Thin Films, Prog. Crystal Growth and Charact., Vol. 30, pp. 129–152, 1995] and the formation of layered films involving a substrate, at least one surface of which is covered, at least partly, with the first layer (called "seed" layer, which will be referred to below as the alignment layer) of a crystalline, uniaxial oriented organic compound, and contains the second layer of a crystalline uniaxial oriented organic compound formed above the first layer, whereby the second layer is subjected during its growth to the aligning action of the first layer. For brevity, the second layer will be referred to below as the epitaxial layer.

The aforementioned known method was intended for the obtaining of layers of organic compounds consisting of a considerable extent of planar molecules composed of chains and (which is more favorable) rings. In a side view, such molecules appear as short straight segments, while viewed from top they appear as circles or ellipses (if the molecular plane is inclined relative to the viewing direction). As a rule, such molecules are packed into stacks, and the stacks form a crystal structure. The molecular stacks are characterized by strongly developed $\pi$ bonds (pi bonds). From the standpoint of crystallography, such crystals represent uniaxial crystals and are characterized by the b-axis coinciding with the stack axis. Orientation of the crystal will be characterized by the angle between the b-axis and the normal to the substrate surface.

Organic compounds preferred for the obtaining of multi-layer films by said known method represent polycyclic aromatic hydrocarbons and heterocyclic compounds. Polycyclic aromatic hydrocarbons are described in literature [see: Morrison and Boyd, Organic Chemistry, Third Edition, Allyn and Bacon Inc., Boston, (1974), Chapter 30; for heterocyclic compounds, see: Ibid, Ch. 31]. Among polycyclic aromatic hydrocarbons, of most interest from the standpoint of the film growth method under consideration are naphthalenes, perylenes, anthracenes, coronenes, and related derivatives. Among heterocyclic compounds (with S, N, and O heteroatoms), the most attractive are phthalocyanines, porphyrins, carbazoles, urines, pterins and their derivatives.

According to said known method, when an epitaxial layer of an organic compound is grown by VPE above an alignment layer, the crystal structure of this epitaxial layer is determined by that of the alignment layer; since the second layer is grown epitaxially on the first one, the b-axis direction in the epitaxial layer will also depend on that in the alignment layer.

Despite all advantages of said known method, it is not free of significant drawbacks. In particular, before growing an organic epitaxial layer possessing a desired orientation of planar organic molecules and required crystallographic parameters, in the general case, it is necessary to apply an alignment layer onto the substrate, which is an independent difficult task. It should be noted that, in said known method, the physical (crystallographic) properties of the alignment layer and the orientation of molecules in this layer significantly depend on the substrate temperature during the growth of this layer. This circumstance may also present a certain disadvantage. Note that any organic compound is characterized by a definite permissible temperature range, which requires special elaboration of the growth technology in application to each particular compound.

According to said known method, a constant temperature regime and vacuum level have to be maintained in the chamber during the whole epitaxial growth process. Any breakdowns in the temperature and vacuum regime lead to the appearance of defects in the growing layer, whereby both crystallographic parameters and the orientation of molecular layer exhibit changes. This sensitivity of the process with respect to instability of the technological parameters can be also considered as a shortcoming of said known method, which is especially pronounced during the formation of thick (1 to 10 µm) epitaxial layers.

Another disadvantage of said known method is the need in sophisticated technological equipment. The reactor chamber must hold ultrahigh vacuum (down to $10^{-10}$ Torr) and must withstand considerable temperature gradients between rather closely spaced zones. The equipment must include the means of heating source and cooling substrates, complicated pumping stage, and facilities for gas admission, temperature and pressure monitoring, and technological process control. The high vacuum requirements make the process expensive and limit the substrate dimensions.

One more disadvantage of said known technology is limitation on the substrate materials: only substances retaining their physical, mechanical, optical, and their properties under the conditions of large pressure differences, high vacuum, and considerable temperature gradients can be employed. Besides, the requirement of matching between crystal lattices of the substrate and the growing film restricts the list of compounds suitable for deposition.

One of the major disadvantages of VPE is the strong influence of defects, present on the initial substrate surface, upon the structure of a deposited layer. The deposition of molecules from the vapor phase enhances/decorates defects on the substrate surface.

There is a method of film deposition from a solution. This method is limited to soluble compounds; most of solvents are highly hazardous liquids, which make manufacturing difficult and expensive. Also, the deposition process is hindered in cases of low wetting ability of the substrate surface.

Another method for thin crystal film manufacturing is described [see: U.S. Pat. Nos. 5,739,296 and 6,049,428 and in the following publications: P. Lazarev, et al., "X-ray Diffraction by Large Area Organic Crystalline Nano-films" Molecular Materials, 14(4), 303–311 (2001), and Y. Bobrov "Spectral properties of Thin Crystal Film Polarizers" Molecular Materials, 14(3), 191–203 (2001)], the disclosures of which are incorporated by reference in their entirety.

There are also known techniques for layer-by-layer electrostatic deposition of materials that form surface film alignments. One of the challenges of self-assembly techniques is the control of in-plane orientation of supramolecules. In bulk samples, uniform alignment is achieved by using lyotropic chromonic liquid crystal (LCLC) materials or by shear of polymer melts. One aspect of this method to provide a structure, wherein the film includes a polyion layer on the substrate, which may or may not be sheared, such that the polyion's charge is attracted to the charge of the substrate. Another aspect of the known method to provide a structure, wherein the film includes a LCLC layer disposed on the polyion layer, and wherein the LCLC layer may or may not be sheared. Another aspect of this invention to provide a structure, wherein of the LCLC layer material is attracted to the polyion layer's polarity. It is still another aspect of the discussed method to provide a structure, in which additional film layers of polyion and LCLC material may be added.

There has been no report on techniques for layer-by-layer electrostatic deposition of conjugated aromatic crystalline layers for obtaining a thin crystal film which is optically anisotropic and at least part of which is electrically conducting.

Intercalation [see: Woo-Chan Jung and Young-Duk Huh, Synthesis of Intercalation Compounds between a Layered Double Hydroxide and an Anionic Dye, Bull. Korean. Chem. Soc., 17, 547–550 (1996)] means mutual penetration (on the molecular level) of two or more substances from neighboring layers in a two or more layered structure. As a result, an intermediate compound is formed between layers of bulk materials. Cracks and pores in one layer can be filled by a material of the neighboring layer. This can lead to electrical and optical properties that were not inherent in the initial layered structure. In particular, intercalation can improve the optical and/or electrical contact between layers.

There has been no report on intercalation of conjugated aromatic crystalline layers for obtaining a thin crystal film which is optically anisotropic and at least part of which is electrically conducting.

SUMMARY OF THE INVENTION

Technical result of the disclosed invention is the broadening of the functional possibilities of application of the anisotropic films while simplifying the method of manufacturing, as well as providing reproducible parameters over the entire area and volume of the film and achieving high levels of anisotropy.

In accordance with the present invention, aromatic conjugated organic material is crystallized so as to form an anisotropic film composed of mostly of the original organic compound without sulfate groups and, at the same time, possessing a global crystal order—the same as that achieved upon the deposition of sulfonated material or modified by sulfonation procedure such as described in the literature [see: U.S. Pat. Nos. 5,739,296 and 6,049,428; and the following publications: P. Lazarev, et al., "X-ray Diffraction by Large Area Organic Crystalline Nano-films" Molecular Materials, 14(4), 303–311 (2001), and Bobrov, Y. "Spectral properties of Thin Crystal Film Polarizers" Molecular Materials, 14(3), 191–203 (2001)].

The disclosed invention represents a method for obtaining an anisotropic film. The first step of method is providing a substrate. The second step is a deposition by means of Cascade Crystallization Process of at least one conjugated aromatic crystalline layer onto said substrate. The conjugated aromatic crystalline layer is characterized by a globally ordered crystalline structure with an intermolecular spacing of 3.4±0.3 Å in the direction of one of the optical axes. The conjugated aromatic crystalline layer is formed by rodlike supramolecules, which comprise at least one polycyclic organic compound with a conjugated π-system and ionogenic groups. The polycyclic organic compound can be disc-shaped. The third step of method is an external action upon at least one deposited conjugated aromatic crystalline layer, wherein duration, character and intensity of the external action are selected so as to ensure the removal of at least a part of ionogenic groups from this conjugated aromatic crystalline layer while retaining the crystalline structure intact after termination of the external action.

Thus a conjugated aromatic crystalline layer produced in the Cascade Crystallization Process is treated so as to remove sulfonic groups or any other ionogenic (hydrophilic) groups, which are selected from the list comprising sulfonic group, COO—, PO4-, cation groups and carboxy groups which were used for creating amphiphilic properties in the organic substance during the Cascade Crystallization Process.

Another aspect of the present invention is an anisotropic film. The film comprises a substrate, at least one modified conjugated aromatic crystalline layer deposited onto said substrate. The modified conjugated aromatic crystalline layer is characterized by a globally ordered crystalline structure with an intermolecular spacing of 3.4±0.3 Å along one of optical axes. The modified conjugated aromatic crystalline layer is formed by rodlike supramolecules, which comprise at least one polycyclic organic compound with a conjugated π-system. At least part of the modified conjugated aromatic crystalline layer has electric conductivity and is slightly soluble or insoluble completely in polar solvents.

BRIEF DESCRIPTION OF THE DRAWINGS

Other objects and advantages of the present invention will become apparent upon reading the detailed description of the invention and the appended claims provided below, and upon reference to the drawings, in which:

DETAILED DESCRIPTION OF THE INVENTION

Figure 1:
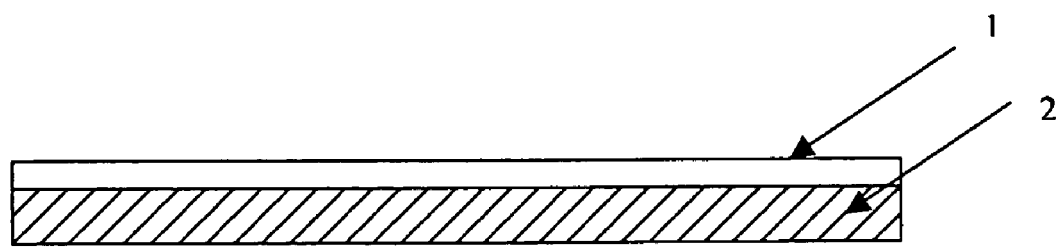
FIG. 1 shows a schematic diagram of a completely conducting anisotropic film formed on a substrate.

As generally described the present invention, a further understanding can be obtained by reference to the specific preferred embodiments, which are provided herein for purposes of illustration only and are not intended to limit the scope of the appended claims.

In one preferred embodiment, the disclosed invention provides a method for obtaining an anisotropic film. The first step of the method is providing a substrate. The second step is a deposition by means of Cascade Crystallization Process of at least one conjugated aromatic crystalline layer onto said substrate. The conjugated aromatic crystalline layer is characterized by the globally ordered crystalline structure with intermolecular spacing of 3.4±0.3 Å in the direction of one of the optical axes. The conjugated aromatic crystalline layer is formed by rodlike supramolecules, which comprise at least one polycyclic organic compound with conjugated π-system and ionogenic groups. The polycyclic organic compound can be disc-shaped. The third step of the method is an external action upon at least one deposited conjugated aromatic crystalline layer, wherein duration, character and intensity of the external action are selected so as to ensure a partial removal of part of ionogenic groups from this conjugated aromatic crystalline layer while retaining the crystalline structure intact after termination of the external action.

The Cascade Crystallization Process involves a chemical modification step and four steps of ordering during the crystal film formation. The chemical modification step introduces hydrophilic groups (ionogenic groups) on the periphery of the molecule in order to impart amphiphilic properties to the molecule. Amphiphilic molecules stack together in supramolecules, which is first step of ordering. By choosing specific concentration, supramolecules are converted into a liquid-crystalline state to form a lyotropic liquid crystal, which is the second step of ordering. The lyotropic liquid crystal is deposited under the action of a shear force (or meniscus force) onto a substrate, so that the shear force (or the meniscus) direction determines the crystal axis direction in the resulting solid crystal film. This shear-force-assisted directional deposition is the third step of ordering. The last, fourth ordering step of the Cascade Crystallization Process is drying/crystallization, which converts the lyotropic liquid crystal into a solid crystal film.

The Cascade Crystallization Process is simple and economically effective method.

This method ensures a high degree of anisotropy and crystallinity of the layers, offers the possibility of obtaining thin crystal films of arbitrary shape (including multi-layer coatings on curvilinear surfaces), and is ecologically safe and low labor and energy consuming.

The Cascade Crystallization Process is characterized by the following sequence of technological operations:

1) Chemical modification of the compound and formation of supramolecules (the first step of ordering);

2) Lyotropic liquid crystal formation (the second step of ordering);

3) Application of a lyotropic liquid crystal of at least one organic compound onto a substrate;

4) External liquefying action upon the lyotropic liquid crystal in order to decrease its viscosity;

5) External aligning action upon the lyotropic liquid crystal in order to impart a predominant orientation to particles of the colloid solution (the third step of ordering);

6) Termination of the external liquefying action and/or application of an additional external action so as to restore the lyotropic liquid crystal viscosity on at least the initial level;

7) Drying (the fourth step of ordering).

Below we describe some stages of Cascade Crystallization Process in more detail.

The formation and structure of supramolecular aggregates in a lyotropic liquid crystal are determined by the concentration and geometry of molecules. In particular, the molecules may combine into lamellae, disk-like (disk-shaped) or rod-like (rod-shaped) micelles, or asymmetric aggregates. Lyotropic liquid crystals usually appear as ordered phases composed of rod-like surfactant molecules in water. These asymmetric (anisometric) aggregates form a nematic liquid crystal or a smectic columnar phase of either nonchiral or chiral (cholesteric phase) nature.

The external liquefying action upon the lyotropic liquid crystal, aimed at decreasing the viscosity, and the external aligning action upon the lyotropic liquid crystal, aimed at imparting a predominant orientation to the particles, can be performed simultaneously, or the external aligning action upon the lyotropic liquid crystal can be performed in the course of the external liquefying action.

The external liquefying action upon the lyotropic liquid crystal can be performed by local and/or total heating of the substrate from the side opposite to that on which the crystal film is formed, and/or by local and/or total heating of the substrate and/or the colloid solution layer from the side on which the conjugated aromatic crystalline layer is formed.

The external liquefying action upon said layer can be performed by a mechanical factor, for example, by shear, applied to the lyotropic liquid crystal layer on a substrate.

The thixotropic properties of lyotropic liquid crystal will be used in this case. The thixotropy describes the ability of a material to decrease of viscosity under shearing and to regain the initial viscosity after termination of shearing. Highly thixotropic lyotropic liquid crystals have the ability to regain its viscosity quickly after shearing. Thus viscosity of thixotropic materials is a function of shear stress or shear rate. The viscosity of thixotropic materials diminishes, when the shear stress (or shear rate) increases.

There are some methods, which are used for orientation of liquid crystals. The process of orientation of thermotropic liquid crystals has been extensively studied from the standpoint of both basic problems and applications. As a rule, orientation technologies employ a special unidirectional treatment of plates (substrates) contacting with the liquid-crystalline material or confining the liquid crystal volume. The external alignment action can be achieved through interaction of a lyotropic liquid crystal with a specially prepared substrate possessing anisotropic properties or covered with special alignment layers. According to known methods, the aforementioned substrates are coated with a special polymer (e.g., polyimide) or with surfactant layer in order to obtain the desired alignment effects. Rubbing this polymer layer renders it capable of producing the aligning action.

The direction of rubbing (i.e., the direction of desired orientation of a thermotropic liquid crystal), is imparted to molecules in the liquid crystal film by means of anisotropic molecular interactions between the alignment film and molecules in the liquid crystal layer adjacent to the substrate. Preferred direction in the liquid crystal is determined by the unit vector n called the liquid crystal director. The alignment action of an anisotropic (e.g., rubbed) substrate upon a liquid crystal is based on the phenomenon called "anchoring". Anchoring is the standard means of orienting in the displays based on thermotropic liquid crystals. The corresponding alignment techniques are well known for thermotropic liquid crystals. However, these methods may be inapplicable to lyotropic liquid crystals because of significant differences between the two classes of these systems.

It is more difficult to orient lyotropic liquid crystals by anchoring than thermotropic ones. This is related to the fact that most liquid crystals of the former type are based on amphiphilic substances (surfactants) soluble either in water or in oil. The amphiphilic molecules possess a polar (hydrophilic) head and a nonpolar (hydrophobic) aliphatic tail. When surfactant molecules are brought into contact with a substrate, the amphiphilic character results in the general case in their being oriented perpendicularly to the substrate surface. Both the polar hydrophilic head and the nonpolar hydrophobic tail are involved in the process of alignment, which results in the perpendicular orientation of molecules with respect to the substrate surface. This orientation, called homotropic, is characterized by the preferred direction (perpendicular to the substrate surface), which also represents the optical axis of the liquid crystal.

The external alignment action upon the surface of an applied colloid solution can be produced by directed mechanical motion of at least one alignment device representing a knife and/or a cylindrical wiper and/or a flat plate oriented parallel to the applied layer surface and/or at an angle to this surface, whereby a distance from the substrate surface to the edge of the aligning instrument is preset so as to obtain a crystal film of the required thickness. The surface of the alignment instrument can be provided with a certain relief. A heated instrument can perform the alignment.

The external aligning action upon the lyotropic liquid crystal is carried out by passing the liquid crystal through a spinneret under pressure in order to impart a predominant orientation to the colloid solution.

Restoration of said layer viscosity, at least on the initial level, can be achieved by terminating the liquefying action either in the course of or immediately after the alignment. After restoration of the lyotropic liquid crystal viscosity on the initial level, an additional aligning action upon the system can be produced in the same direction as that in the main alignment stage.

The drying should be performed at room temperature and a humidity of not less than 50%. Upon the drying stage, conjugated aromatic crystalline layers usually retain about 10% of solvent. Prior to performing subsequent stages according to the disclosed method, the content of solvent in the layer should be decreased to 2–3% by additional annealing.

Upon accomplishing the above operations, Cascade Crystallization Process yields conjugated aromatic crystalline layers with a globally ordered crystalline structure, which is characterized by an intermolecular spacing of 3.4±0.3 Å along one of optical axis.

The major advantage of the Cascade Crystallization Process is a weak dependence of the film on the substrate surface defects. This weak dependence is due to the viscous and elastic properties of the lyotropic liquid crystal. The elastic layer of a liquid crystal prevents development of the defect field and inhibits defect penetration into the bulk of the deposited layer. Elasticity of the lyotropic liquid crystal acts against reorientation of the molecules under the action of the defect field. Molecules of the deposited material are packed into lateral supramolecules with a limited freedom of diffusion or motion.

The conjugated aromatic crystalline layer produced by this method has a global order or in other words such layer has the globally ordered crystalline structure. The global order means that the deposition process controls the direction of the crystallographic axis of the anisotropic crystalline layer over the entire layer surface or substrate surface. Thus, the conjugated aromatic crystalline layer differs from a polycrystalline layer, in which the uniform crystalline structure is formed inside a separate crystallite. The square of such crystallite is much less than the square of the layer surface or substrate. Also in the discussed conjugated aromatic crystalline layer the limited influence of the substrate surface on its crystalline structure takes place. The conjugated aromatic crystalline layer can be formed on a part of the surface of the substrate or on the entire surface depending in the requirements. In both cases the conjugated aromatic crystalline layer is characterized by the global order.

The conjugated aromatic crystalline layer obtained by this method is the globally ordered structure of special type. This layer is not crystal or polycrystal in the usual sense. Methods of coating provide control of the crystallographic axes direction of the conjugated aromatic crystalline layer formed on the substrate during deposition, drying, and crystallization. The conjugated aromatic crystalline layer has monoclinic symmetry. Flat molecules of the organic substance, for example of aromatic organic dyes, are packed in a layered crystalline structure with a flat plane oriented perpendicular to the surface of the substrate and coating direction. For the denotation of such special type of the globally ordered structure it is necessary to utilize the special term: conjugated aromatic crystalline layer.

The presence of sulfate/sulfite groups which are ionogenic, hydrophilic in the resulting anisotropic crystalline layer (conjugated aromatic crystalline layer) interferes with electronic properties of the conjugated aromatic crystalline layer. Ionogenic (hydrophilic) groups change the optical and electronic properties of the material and it is desirable to remove these groups without (or with minimal) changes in the global ordered structure of the conjugated aromatic crystalline layer.

Chemical modification of a material by producing a partial cracking of its molecules or by removing a part of the molecule under the action of elevated temperature is pyrolysis.

Pyrolysis (from Greek "pyr" for fire and "lysis" for decay) means decomposition and/or other transformations of chemical compounds on heating [see: R. Morrison and R. Boyd, Organic Chemistry, Third Edition, Allyn and Bacon Inc., Boston, (1974)]. The term pyrolysis is most widely employed in the organic chemistry [Lyle F. Albright, Billy L. Crynes, William H. Corcoran, Pyrolysis theory and industrial practice, Academic Press, 1983], where it refers to high-temperature destructive transformations of organic substances, accompanied by their decomposition into products of smaller molecular weights (up to simple compounds) as well as by isomerization, polymerization, or polycondensation of the initial compounds and the conversion products [see: Brown R. F., Pyrolytic Methods in Organic Chemistry, New York (1980); Encyclopedia of Chemistry, McGraw-Hill, New York (1983), pp. 14–15]. Examples of pyrolysis in organic chemistry can be found in technical literature [see: Calvin A. Buehler, Donald E. Pearson, Survey of Organic Syntheses, Wiley-Interscience, New York (1970)] including, in particular, the pyrolysis of amine oxides (the Cope reaction). Pyrolysis is widely used in petrochemical industry for the chemical modification of oil carbohydrates in the bulk. This method is also widely employed for the conversion of acyclic, alicyclic, and heterocyclic amines. The process of pyrolysis is usually conducted at a temperature of 120–150° C., but the reaction can well be performed at 25° C. in a mixture of anhydrous dimethyl sulfoxide and tetrahydrofuran [see: Cram, D. J. et al., J. Am. Chem. Soc., 84, 1734 (1962)]. Investigations into the pyrolysis of sulfoxides into alkenes included a study of the behavior of 1,1-diphenylpropylphenyl sulfoxide [see: Kingsbury, C. A. and Cram D. J., J. Am. Chem. Soc., 82, 1810 (1960)] and 3-phenylpropylmethylsulfoxide [Org. Chem., 29, 2699 (1964).] The pyrolysis processes of hydrocarbons are also known. As is known, the bonds in hydrocarbons are broken on heating to 500–700° C., which is accompanied by the formation of free radicals. The final products formed from these radicals depend on their relative stability. Most frequently encountered products are hydrogen, methane, ethylene, and especially 1,3-dienes. In order to provide for a high yield of the products, the substrate should be heated, as rapidly and uniformly as possible, up to the dissociation temperature and then also rapidly cooled. It is possible to perform pyrolysis of acids, anhydrides, ketones, and esters. Apparently, any organic compound containing acetyl groups can be expected to yield a certain amount of ketone in the course of pyrolysis. Various laboratory procedures were described [see: Williams, J. W. and Hurd C. D., J. Org. Chem., 5, 122 (1940)], in which the best yield of ketones was observed from acetone passed over a chromel A wire heated to 700–750° C. When the pyrolysis is performed in a reactor chamber, the process should be conducted at a lower temperature (about 500° C.) in order to prevent further decomposition of the products of pyrolysis into carbon monoxide and gaseous olefins. The above examples show that the use of pyrolysis is mostly restricted to the obtaining of new organic compounds. At the best of our knowledge there is no data on the use of pyrolysis for obtaining a thin crystal film which is optically anisotropic and at least part of which is electrically conducting, intended for the optical applications (such as polarizers and retarders) and electronic devices (such as solar cells, CCDs, thin film transistor integrated circuits, light-emitting diodes, and light emitting displays). Nor was the pyrolysis used so as to improve the physical properties of such multilayer films, in particular, to increase the electro conductivity simultaneously with the mechanical strength and adhesion.

It should be noted that the aforementioned ionogenic groups, in particular sulfonic groups, are extremely effective traps for the mobile charge carriers (electrons and/or holes) in the thin crystal film material. For this reason, removal of these groups leads to an increase in the density and mobility of charge carriers (electrons and/or holes) and, hence, to an increase in the electric conductivity of conjugated aromatic crystalline layers, which were subjected to the external action. Moreover, the removal of ionogenic groups results in decreasing solubility of the conjugated aromatic crystalline layers in polar solvents. For the sake of brevity, the conjugated aromatic crystalline layer subjected to the external action will be referred to below as the modified conjugated aromatic crystalline layer. Thus, the modified conjugated aromatic crystalline layer has an increased electric conductivity and a decreased solubility (or is incompletely soluble) in polar solvents in comparison to a conjugated aromatic crystalline layer.

According to the disclosed method, the ionogenic groups are selected from the list comprising sulfonic group, COO—, PO4-, cation groups and carboxy groups.

According to the disclosed method, the external action upon the conjugated aromatic crystalline layer is performed by local and/or total heating of the conjugated aromatic crystalline layer up to a pyrolysis temperature. The temperature of pyrolysis is characteristic of each organic substance and should be determined experimentally for each organic compound to be processed. In our case, by the pyrolysis temperature is implied the temperature of treatment leading to the breakage of bonds and the detachment of ionogenic (hydrophilic) groups used to impart amphiphilic properties to the organic compound.

More precisely, the temperature of pyrolysis can be defined on the basis of data of derivatographic analysis. The derivatographic analysis or the analysis of temperature dependence of weight loss of organic compound sample at deleting from them the sulfonic, sulfate or sulfite groups has shown that pyrolysis temperature in this case is in the range between 300° C. and 400° C. Most preferable pyrolysis temperature is in the range between 330° C. and 350° C. The removing of ionogenic groups is confirmed by research of their solubility in polar solvents. The solubility of such samples becomes less after their thermal processing in the indicated temperature range. To ensure that the ionogenic groups are removed by treatment in the indicated temperature range, it is desirable to use an additional infrared spectroscopic analysis.

According to the disclosed method, the conjugated aromatic crystalline layer can be heated by various means, for example, using concentric electrical heaters and/or electromagnetic radiation and/or resistive heaters and/or alternating electric or magnetic fields and/or a flow of heated liquid or gas.

The removal of ionogenic groups, in particular sulfonic groups, can be performed by an external action carried out on at least part of the conjugated aromatic crystalline layer, using microwave radiation and/or laser radiation. The frequency, the intensity and the duration of said external action are selected so as to ensure a partial removal of part of ionogenic groups from the conjugated aromatic crystalline layer while retaining the crystalline structure intact after termination of the external action. The radiation frequency (or the corresponding photon energy) is selected so as to be in resonance with at least one absorption band of the organic compound (the energy of binding of the ionogenic groups). The radiation frequency (photon energy) has to be selected such that the detachment of the ionogenic (hydrophilic) groups would not be accompanied by breakage of the other bonds in the organic compound. The radiation frequency and duration are experimentally selected for each organic compound.

In addition, the external action upon at least part of the conjugated aromatic crystalline layer can be performed by the method of two-photon absorption of laser radiation, whereby the sum frequency of two photons of laser radiation is in resonance with at least one absorption band of the organic compound.

Thus, the frequency, intensity and duration of the irradiation must be selected so as to remove the sulfonic groups, or other ionogenic (hydrophilic) groups selected from the list of COO—, PO4-, cation groups, carboxy groups, which impart amphiphilic properties to the organic compounds. This list of ionogenic groups is provided for illustrative purpose only and is not intended to limit the present invention in any way.

According to the disclosed method, the electrically conducting part of at least one conjugated aromatic crystalline layer is formed by a local external action in shape of a topological pattern. In one embodiment of the disclosed method, wherein a part of at least one conjugated aromatic crystalline layer is not subjected to the external action and, hence, contains the ionogenic groups, this part of a conjugated aromatic crystalline layer is dissolved with the help of the polar solvents. In another embodiment of the disclosed method, additional operations are performed prior to the external action so as to apply a mask of a material insoluble in polar solvents. Subsequent treatment in a polar solvent removes the unprotected part of the conjugated aromatic crystalline layer, which is followed by removal of the mask and drying.

The substrate thickness is not limited by the disclosed method. The heating can be effected for example from the side of substrate. It should be noted that pyrolysis increases mechanical strength of the anisotropic film and improves adhesion of the anisotropic film to substrate.

According to the disclosed method, the substrate can be made of a material whose temperatures of destruction (melting, or sublimation, or decomposition, or the reaction with the organic substance of the conjugated aromatic crystalline layer) exceeds the temperature to which the substrate is heated in the course of external action upon said conjugated aromatic crystalline layer. According to the disclosed method, the substrate can be either flexible or rigid. The substrates can possess flat, convex, or concave surface, or the surface of a preset geometric shape combining the above types. The substrate is made of any materials of the group comprising plastics, metals, ceramics, glass, metal-ceramic composites, and various combinations of these materials.

The list of organic materials (plastics) comprises polyimides, polycarbonates, polyesters and polyacrylates. The list of metals comprises aluminum, cobalt, copper, molybdenum, nickel, platinum, tantalum, and related alloys. An important condition for the applicability of a given metal as a substrate material is that its melting point must be higher than the temperature to which the substrate is heated in the course of external actions. Metals and their oxides are inert substrate materials, which produce no significant influence upon the properties of the organic layers grown on their surfaces. Anisotropic properties of the substrate, at least on a part of its surface, can be due to either chemical bonds, or relief or texture, which are formed on the substrate surface, and which are made of the substrate material, or of another material. The substrate can also bear an additional surfactant layer, which does not hinder the formation of a liquid crystal phase in the adjacent conjugated aromatic crystalline layer and increases adhesion of this conjugated aromatic crystalline layer to the substrate or to another conjugated aromatic crystalline layer.

In a possible embodiment of the disclosed method, at least one alignment layer is additionally applied onto (or formed on) said substrate. This alignment layer can be formed on the substrate by method of oblique deposition of the special material from gas (vapor) phase. One possible special material is silicon dioxide. In another possible embodiment of the disclosed method, at least one alignment layer is made of a polymeric material oriented by rubbing in a certain preset direction. In addition, there is a variant of this embodiment of the disclosed method, whereby the polymer (alignment layer) is photosensitive polymeric material, which is oriented by exposure to a polarized light. In one possible embodiment of the disclosed method, the substrate is covered with polyion layer. In another possible variant, said polyion layer is positively charged in the course of deposition from an aqueous solution onto said substrate, while the substrate is charged negatively in order to attract said polyion layer by means of electrostatic interaction. In still another embodiment, said conjugated aromatic crystalline layer contains negatively charged ionogenic groups at the periphery of molecules of organic compounds, whereby at least one of these groups attracts to said polyion layer. The group of polymers, which can be used to create said polyion layer, may comprises poly(diallyldimethylammonium chloride), poly(ethyleneimine), and poly (allylamine hydrochloride).

The external action upon the conjugated aromatic crystalline layer is performed in an atmosphere of a buffer gas. The buffer gas is any from the list of He, Ar, Xe and any other inert gas, $N_2$, $CO_2$, and any other nonreactive gas. This list only gives some examples, by no means restricting the selection of a buffer gas: other gases and gas mixtures can be used as well.

The organic compound for the obtaining of a lyotropic liquid crystal may comprise at least one aromatic compound of the general structural formula {K} (M)n, where K is a polycyclic organic compound with conjugated π-system, which comprises one or more ionogenic groups, either like or unlike, ensuring the solubility in polar solvents for the formation of the lyotropic liquid crystal phase; M are modifying functional groups; and n is the number of functional groups.

In order to obtain an anisotropic film a lyotropic liquid crystal can be prepared using an organic compound comprising at least one polycyclic dye or a derivative of such dye containing sulfonic and/or carboxy and/or phosphate and/or other groups, capable of forming a lyotropic liquid crystal phase.

The organic compound for the obtaining of an anisotropic film can be also prepared based on one of the group comprising indanthrone (Vat Blue 4), 1,4,5,8-perylenetetracarboxylic acid dibenzoimidazole (Vat Red 14), or 3,4,9,10-perylenetetracarboxylic acid dibenzoimidazole, quinacridone (Pigment Violet 19), or their mixtures.

The organic compound for the obtaining of an anisotropic film can be also prepared based on 3,4,9,10-pyrylenetetracarboxylic dianhydride (PTCDA) or bis-(1,2,5-thiadiazolo)-p-quinobis-(1,3-dithiol) (BTQBT) or aluminum tris(8-hydroxyquinoline) (Alq3). It was established that layers with hole (p-type) conductivity can be obtained using PTCDA and BTQBT, and some other analogous compounds and their derivatives. The layers possessing electron (n-type) conductivity can be made of Alq3 [Kepler et al., Electron and Hole Mobility in Tris-(8-hydroxyquinolinolato-N1, O8) Aluminum, Appl. Phys. Lett., Vol. 66, 3618 (1995)].

The organic compound for the obtaining of an anisotropic film can be also prepared based on various phthalocyanines. Depending on the metal salt and the valence of the metal (Me), a variety of phthalocyanines can be synthesized. In particular, Me can represent a pair of hydrogen atoms, such as in metal-free phthalocyanine, H2Pc. It can also be a monovalent or divalent metal such as in Li2Pc or MgPc. When Me is trivalent, Me can be a metal halide or a metal hydroxide, such as in AlClPc and AlOHPc. In the case of tetravalent metals, Me can be a metal oxide, a metal dihalide or a metal dihydroxide, such as in TiOPc, SiCl2Pc, and Si(OH)2Pc. In addition to the central metal ion, structural variation can be accomplished by substitutions on the phthalocyanine ring, such as sulfonic acid (or amide), carboxylic acid, alkyl, aryl, halide, nitro, etc. Other phthalocyanines can also be used such as, for example, VOPC, CrPc, FePc, CoPc, NiPc, CuPc, ZnPc, SnCl2Pc, PbPc, Ge(OH)2Pc, InBrPc, and their mixtures.

The organic compound for the obtaining of an anisotropic film can be also prepared based on various pigments such as 3,3'-dichlorobenzidine, or 2,7-diaminofluorenone, or 2,6-diaminoanthraquinone, or 2,7-diaminoanthraquinone, or (p-aminophenyl)phenylamine, or tris(p-aminophenyl)amine, or 2,7-diaminodibenzothiophene sulfone, or 2,7-diaminodibenzothiophene, or 2-(p-aminophenyl)-6-aminobenzoxazole, or bis(p-aminophenyl)amine, or N-methylbis(p-aminophenyl)amine, or 2,5-bis(p-aminophenyl)-1,3,4-oxadiazole, or 1,6-diaminopyrene, or 1,5-diaminonaphthalene, or other similar organic substances and their mixtures.

In one possible embodiment of the disclosed method, the anisotropic films are formed by at least two sequentially formed conjugated aromatic crystalline layers by means of Cascade Crystallization Process, wherein the duration, character, and intensity of the external action are selected so as to ensure a partial removal of part of ionogenic groups from at least part of the conjugated aromatic crystalline layer, while retaining the crystalline structure of this conjugated aromatic crystalline layer and all previously formed conjugated aromatic crystalline layers intact after termination of the external action. In one variant of the disclosed method of obtaining anisotropic films, the external action on each subsequent conjugated aromatic crystalline layer consists in heating at least a part of this conjugated aromatic crystalline layer to the temperature of pyrolysis, wherein the organic compounds used to form the subsequent conjugated aromatic crystalline layers are selected so that the temperature of pyrolysis of each next conjugated aromatic crystalline layer would be lower than that of the preceding conjugated aromatic crystalline layers. In another variant of the disclosed method of obtaining anisotropic films, the film is subjected to an additional external thermal action, the duration, character, and intensity of which are sufficient to provide for the mutual intercalation of organic substances in at least one pair of adjacent conjugated aromatic crystalline layers. The intercalation ensures better mechanical and/or electrical contact between one conjugated aromatic crystalline layer and substrate and/or another conjugated aromatic crystalline layer. In still another possible variant, the intercalation temperature is selected below the temperature of pyrolysis of the conjugated aromatic crystalline layer, which has been exposed to an external action by the latter.

In the variant wherein said anisotropic film contains not less than two conjugated aromatic crystalline layers, the process may include an additional stage: the formation of at least one polyion layer between said conjugated aromatic crystalline layers. In one possible embodiment of the disclosed method, said polyion layers are oppositely charged with respect to the conjugated aromatic crystalline layer. In another embodiment, at least one polyion layer can be oriented by any of the known methods in a certain preset direction before the formation of said conjugated aromatic crystalline layer. In a possible variant, at least one of two conjugated aromatic crystalline layers, which are formed together with said polyion layer, is further oriented by any of the known methods in the same direction as the polyion layer. In another variant the method further comprises an alignment of the conjugated aromatic crystalline layers in the opposite directions, wherein the alignment directions are opposite for each pair of subsequent conjugated aromatic crystalline layers. There is another possible embodiment of the disclosed method, wherein the thickness of at least one said polyion layer is equal to the size of a polyion molecule.

In another preferred embodiment, the disclosed invention provides an anisotropic film comprising a substrate, a modified conjugated aromatic crystalline layer deposited onto said substrate. The modified conjugated aromatic crystalline layer is characterized by globally ordered crystalline structure with intermolecular spacing of 3.4±0.3 Å along one of optical axes. Said modified conjugated aromatic crystalline layer is formed by rodlike supramolecules, which comprise at least one disc-shaped polycyclic organic compound with conjugated π-system. At least part of the modified conjugated aromatic crystalline layer has electric conductivity and is slightly soluble or nonsoluble completely in polar solvents. This film retains the anisotropic properties imparted by the aligning action in the stage of the anisotropic film formation. In this stage, the organic compound contains ionogenic groups, for example, sulfonic groups. As a result of the external action according to the disclosed invention, these ionogenic groups are removed from the organic compound. For this reason, the remaining conducting anisotropic crystal film acquires additional electronic and optical properties: electron and/or hole conductivity, increased drift mobility of electrons and/or holes. In addition, the disclosed conducting anisotropic crystal films possess increased mechanical strength and improved adhesion to substrate. Such anisotropic films have the diminished solubility in polar solvents.

In one embodiment of anisotropic film the substrate is made of one or several materials selected from the list comprising plastics, glasses, ceramics, metal-ceramic composites, and metals. In another embodiment of this invention, the thin crystal film has the substrate material, which is selected from the group including aluminum, cobalt, copper, molybdenum, nickel, platinum, tantalum, or a related alloy. In one else embodiment of this invention the substrate is made of a flexible material. In another embodiment the substrate is made of a rigid material. In this invention it is possible that the substrates can be different form, for example, flat, convex, or concave surface, or a complicated geometric shape combining these said forms.

In one embodiment of anisotropic film the organic compound used for preparing a conjugated aromatic crystalline layer can comprise at least one aromatic compound with the general structural formula {K}(M)n, where K is a polycyclic organic compound with a conjugated π-system, which contains one or more ionogenic groups, either like or unlike, ensuring the solubility in polar solvents for the formation of the lyotropic liquid crystal phase; M are modifying functional groups; and n is the number of functional groups.

According to the disclosed invention, the electrically conducting part of the modified conjugated aromatic crystalline layer of the anisotropic film may be made in the form of a topological pattern.

In addition, the anisotropic film may additionally comprise at least one protective layer on the surfaces of anisotropic film.

In addition, at least one adhesive layer can be formed, on top of anisotropic film. In one embodiment, the anisotropic film contains at least one antireflective layer formed on the film top. In addition, the anisotropic film may additionally comprise at least one layer absorbing ultraviolet and/or infrared radiation, formed on top of the film. An anisotropic film according to the disclosed invention may contain, depending on the field of application, from one to several modified conjugated aromatic crystalline layers. According to this invention, the number of said modified conjugated aromatic crystalline layers is not restricted. The anisotropic film according to the disclosed invention may contain two or more modified conjugated aromatic crystalline layers. The thickness of each modified conjugated aromatic crystalline layer is also arbitrary, or can be controlled, ranging from a single monomolecular layer (~0.5 nm) up to a value (e.g., ~1 μm) at which the layer exhibits bulk properties. Additional intermediate layers (protective, adhesive, clarifying films, and layers absorbing ultraviolet and/or infrared radiation) also contribute to the total film thickness. Accordingly, a thickness of the anisotropic film according to the disclosed invention may vary (not taking into account the substrate thickness) from 0.5 nm up to several microns.

FIG. 1 shows the schematic diagram of a completely conducting, anisotropic film comprising a modified conjugated aromatic crystalline layer (1) on a substrate (2). The Cascade Crystallization Process forms the conjugated aromatic crystalline layer. The conjugated aromatic crystalline layer is characterized by the globally ordered crystalline structure with intermolecular spacing of 3.4±0.3 Å in the direction of one of the optical axes. Said layer is formed by rodlike supramolecules, which comprise at least one disc-shaped polycyclic organic compound with conjugated π-system and ionogenic groups. The conjugated aromatic crystalline layer was completely subjected to an external action: heated to a pyrolysis temperature and/or exposed to microwave and/or laser radiation, as a result of which ionogenic groups were removed from the whole conjugated aromatic crystalline layer and the material was rendered conducting. The substrate can be made of various materials, including ceramics, metal-ceramic composite, glass, plastic, or metal. It is important to ensure that the substrate material would not decompose, sublime, or melt at temperatures developed during the action of external factors.

Figure 2:
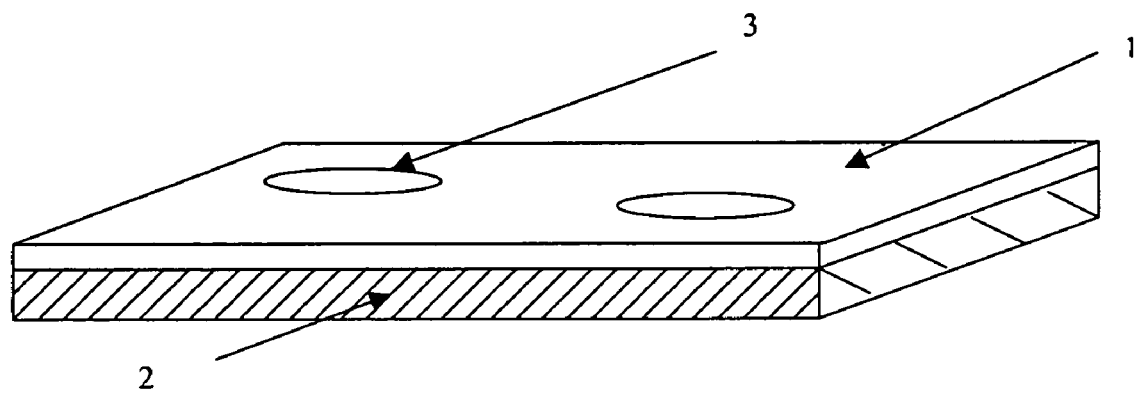
FIG. 2 shows a schematic diagram of a locally conducting anisotropic film formed on a substrate.

FIG. 2 shows the schematic diagram of a locally conducting, anisotropic film comprising a modified conjugated aromatic crystalline layer (1) on a substrate (2). The Cascade Crystallization Process forms the conjugated aromatic crystalline layer. Said layer is formed by rodlike supramolecules, which comprise at least one disc-shaped polycyclic organic compound with conjugated π-system and ionogenic groups. The conjugated aromatic crystalline layer was subjected to an external action: heated to a pyrolysis temperature and/or exposed to microwave and/or laser radiation. The external action was applied locally. As a result, ionogenic groups were removed from some regions (3) of the conjugated aromatic crystalline layer, in which the material was rendered conducting. The substrate can be made of various materials, comprising ceramics, metal-ceramic composite, glass, plastic, or metal. It is important to ensure that the substrate material would not decompose, sublime, or melt at temperatures developed during the action of external factors.

Figure 3:
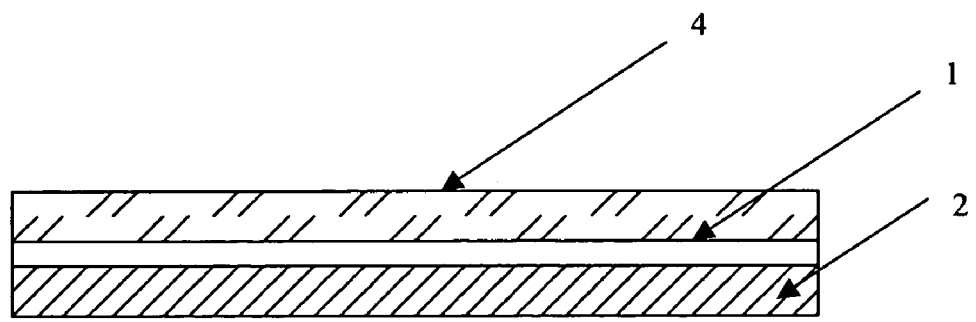
FIG. 3 shows a schematic diagram of a completely conducting anisotropic film formed on a substrate and comprised of a protective layer formed on top of the anisotropic film.

FIG. 3 shows the schematic diagram of a completely conducting, anisotropic film comprising a modified conjugated aromatic crystalline layer (1) deposited onto a substrate (2) and covered with a protective layer (4) formed on top of the anisotropic film. The conjugated aromatic crystalline layer is formed by rodlike supramolecules, which comprise at least one disc-shaped polycyclic organic compound with a conjugated π-system and ionogenic groups. The layer was completely subjected to an external action: heated to a pyrolysis temperature and/or exposed to microwave and/or laser radiation, as a result of which ionogenic groups were removed from the whole layer and the material was rendered conducting. The substrate can be made of various materials, comprising ceramics, metal-ceramic composites, glasses, plastics, or metals. It is important to ensure that the substrate material would not decompose, sublime, or melt at temperatures developed during the action of external factors. The protective layer prevents the anisotropic film from damaging action of the surrounding medium.

Figure 4:
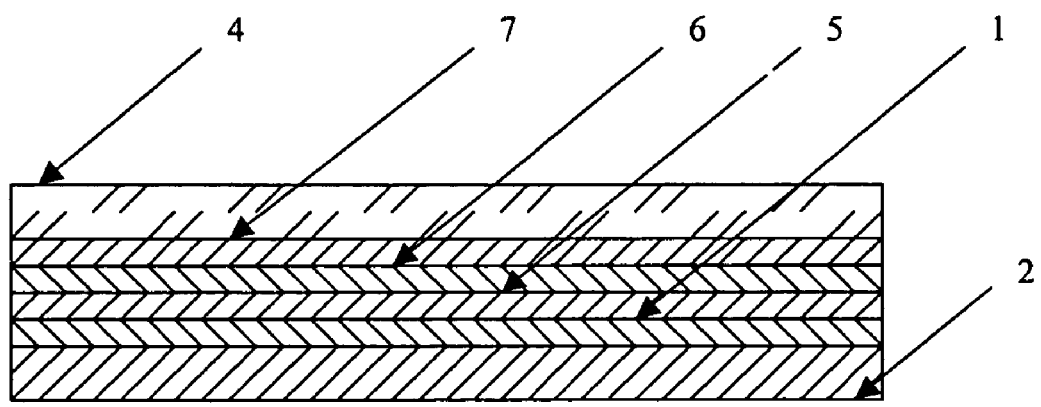
FIG. 4 shows a schematic diagram of a multilayer anisotropic film formed on a substrate and comprised of a protective layer formed on top of the anisotropic film.

FIG. 4 shows the schematic diagram of an anisotropic film composed of several modified conjugated aromatic crystalline layers (1, 5, 6, and 7) made of lyotropic liquid crystal based on an organic compounds deposited by Cascade Crystallization Process onto substrate (2) and then exposed to external actions. The substrate can be made of various materials, including ceramics, metal-ceramic composites, glasses, plastics, or metals. It is important to ensure that the substrate material would not decompose, sublime, or melt at temperatures developed during the action of external factors. The protective layer (4) prevents the anisotropic film from damaging action of the surrounding medium.

Figure 5:
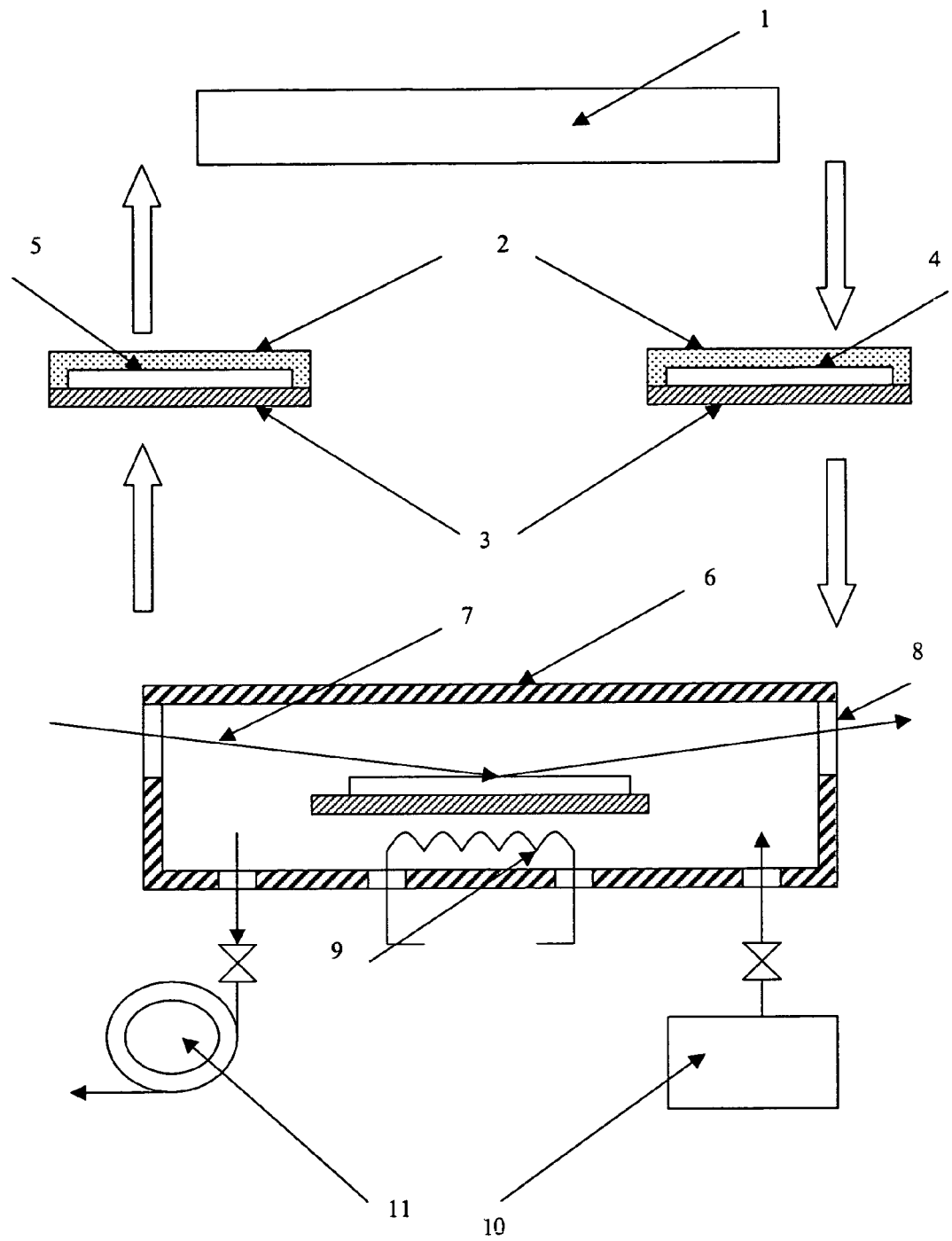
FIG. 5 shows the sequence of technological operations for manufacture of an anisotropic film.

The disclosed method is conducted in a special setup for obtaining an anisotropic film. The setup comprises a reactor vacuum chamber, accommodating a substrate holder on which at least one substrate can be mounted, and facilities for obtaining vacuum in the reactor chamber, supplying a buffer gas to the reactor chamber, and heating and/or irradiating the conjugated aromatic crystalline layers, the mechanism for moving evocative above resources for heating and/or irradiating. FIG. 5 represents the sequence of technological operations necessary for manufacture of an anisotropic film. The following denotations are utilized: Cascade Crystallization Process (1), a protective layer (2), a substrate (3), a conjugated aromatic crystalline layer (4), an anisotropic film (5), a chamber (6), a microwave radiation and/or a laser radiation (7), an optically transparent window (8), a resistive heater (9), a facility for supplying buffer gas into the chamber (10), a facility for obtaining vacuum in the chamber (11).

In one possible embodiment, the setup may contain a substrate holder of the cassette type in which there are at least two parallel stages for mounting substrates intended for the deposition of anisotropic films. There are various possible variants of substrate holders. For example, a substrate holder of the cassette type may consist of at least two horizontal stages for mounting substrates one above another and/or at least two vertical stages for mounting the substrates one behind another. A substrate holder of the cassette type can be either fixed in the reactor vacuum chamber or it can be introduced into the reactor vacuum chamber through vacuum-lock windows situated on side and/or on top of this chamber. In one possible embodiment, the setup may contain a substrate holder of the cassette type in which there are at least two parallel stages for mounting substrates intended for the deposition of anisotropic films. The facilities for obtaining vacuum in the disclosed device may include mechanical pumps and/or ion pumps and/or oil diffusion pumps and/or turbomolecular pumps and/or any other pumping facilities or their combinations. The facilities for supplying a buffer gas to the reactor chamber may include various leak valves and/or porous membranes and/or other gas inlet systems and devices. It is possible to employ various means of heating, including radiation sources and/or resistive heaters and/or alternating electric or magnetic fields and/or a flow of heated liquid or gas. The heating devices can be arranged in different ways. In particular, such devices can be mounted under the substrate holder or placed above the surface of a crystal film or a multilayer coating and arranged so as to heat the whole or at least a part of the surface of the crystal film.

In one embodiment, a setup according to the disclosed invention contains microwave and/or laser radiation sources.

In such embodiment, the microwave sources can be mounted inside and/or outside the reactor chamber and provided with a flexible waveguide or cable, one end of which is connected to the source output and the other, to a mechanism moving the irradiation facilities. In another embodiment, a laser is mounted inside and/or outside the reactor chamber and provided with a flexible optical fiber, one end of which is connected to the laser output and the other, to a mechanism moving the irradiation facilities. In still another possible embodiment, said mechanism is capable of moving the heating and/or irradiation facilities in two dimensions parallel to the surface of a processed planar conjugated aromatic crystalline layer exposed to an external factor. In one more possible embodiment, the means of heating and/or irradiation of the conjugated aromatic crystalline layer are mounted inside and/or outside the reactor chamber either stationary or on a mechanism moving these facilities. In addition, a system can be provided, whereby said facilities for irradiation of the conjugated aromatic crystalline layers are mounted outside the reactor chamber either stationary or on a mechanism moving these facilities and the reactor chamber is provided with a window transparent for the radiation employed, through which the conjugated aromatic crystalline layers are processed.

The setup may additionally contain a means of control and adjustment. In particular, a temperature sensor placed under the substrate holder can provide for maintaining a preset temperature, at least on a part of the crystal film surface. In addition, the setup can be provided with facilities for controlling the processes of creating vacuum in the reactor chamber and/or supplying buffer gases and/or heating and/or irradiating the crystal films. The setup can be also provided with a means of control for the level of vacuum in the reactor chamber and/or the pressure of a buffer gas and/or the temperature of heating and/or the intensity of irradiation of the conjugated aromatic crystalline layers

EXPERIMENTAL

A number of experiments were conducted according the method and system of the present invention. These experiments are intended for illustration purposes only, and are not intended to limit the scope of the present invention in any way.

Figure 6:
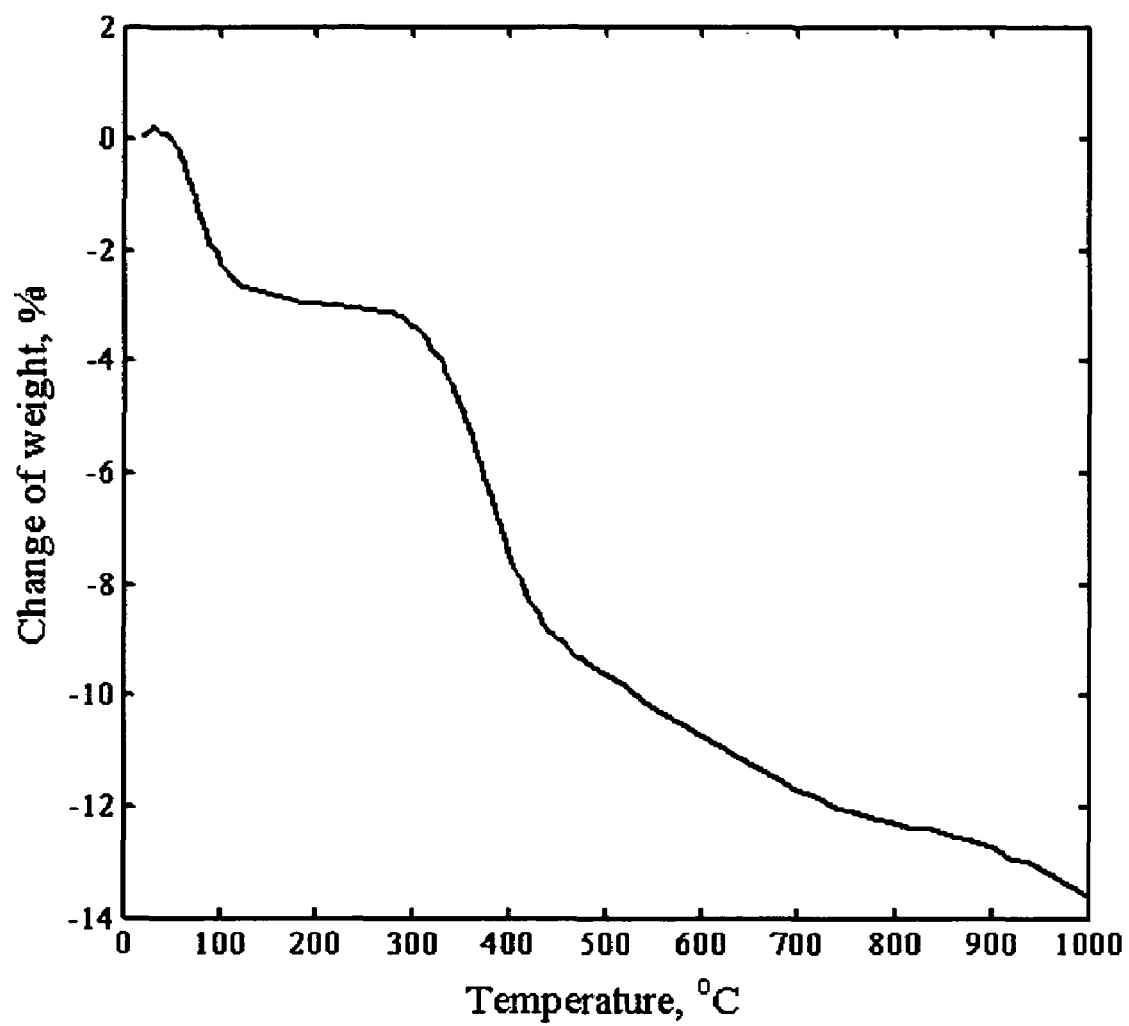
FIG. 6 shows the thermo-analytical curve characterizing variation of the sample weight in the course of heating of a sample of indanthrone when temperature was increased from ambient temperature (21.6° C.) up to 1000° C. with constant speed of increase of temperature, which was equal to 4.9–5.0 degrees per minute.

In one experimental example an anisotropic film is presented, which formed on a substrate using indanthrone as an organic compound for the formation of a lyotropic liquid crystal. The conjugated aromatic crystalline layer was formed by one of the known methods described above. The substrate was a glass plate. The results of measurements performed after drying of the obtained conjugated aromatic crystalline layer confirmed its anisotropic optical properties. Then the conjugated aromatic crystalline layer was subjected to an external thermal action in order to remove sulfonic groups from the organic compound. The sample was heated by a resistive heater in an atmosphere of nitrogen (buffer gas). As a result, of this treatment, at least part of the residual sulfonic groups were removed from the organic compound. FIG. 6 presents the thermo-analytical curves characterizing variation of the sample weight in the course of heating of a sample of indanthrone. The temperature was increased from ambient temperature (21.6° C.) up to 1000° C. with constant speed of increase of temperature, which was equal to 4.9–5 degrees per minute. FIG. 6 shows that heating in the temperature interval from 300 to 400° C. accompanied by intensive variation of the weight of the conjugated aromatic crystalline layer, whereby the measured weight loss corresponds to the mass fraction of sulfonic groups in the organic compound. According to the experimental data obtained, the process of heating should be conducted at a temperature of pyrolysis. According to FIG. 6, the temperature of pyrolysis required for the obtaining of an anisotropic film which is optically anisotropic and at least part of which is electrically conducting based on indanthrone must be no more than 350° C. The removing of ionogenic groups is confirmed by research of their solubility in polar solvents. The solubility of such samples becomes less after their thermal processing in the indicated temperature range. It should be emphasized that the temperature of external action should be selected as low as possible, since the higher this temperature, the more intensive the degradation processes in the conjugated aromatic crystalline layer material.

In second experimental example an anisotropic film is presented, which formed on a substrate. In this example the indanthrone also was used as an organic substance for the formation of a lyotropic liquid crystal.

Figure 7:
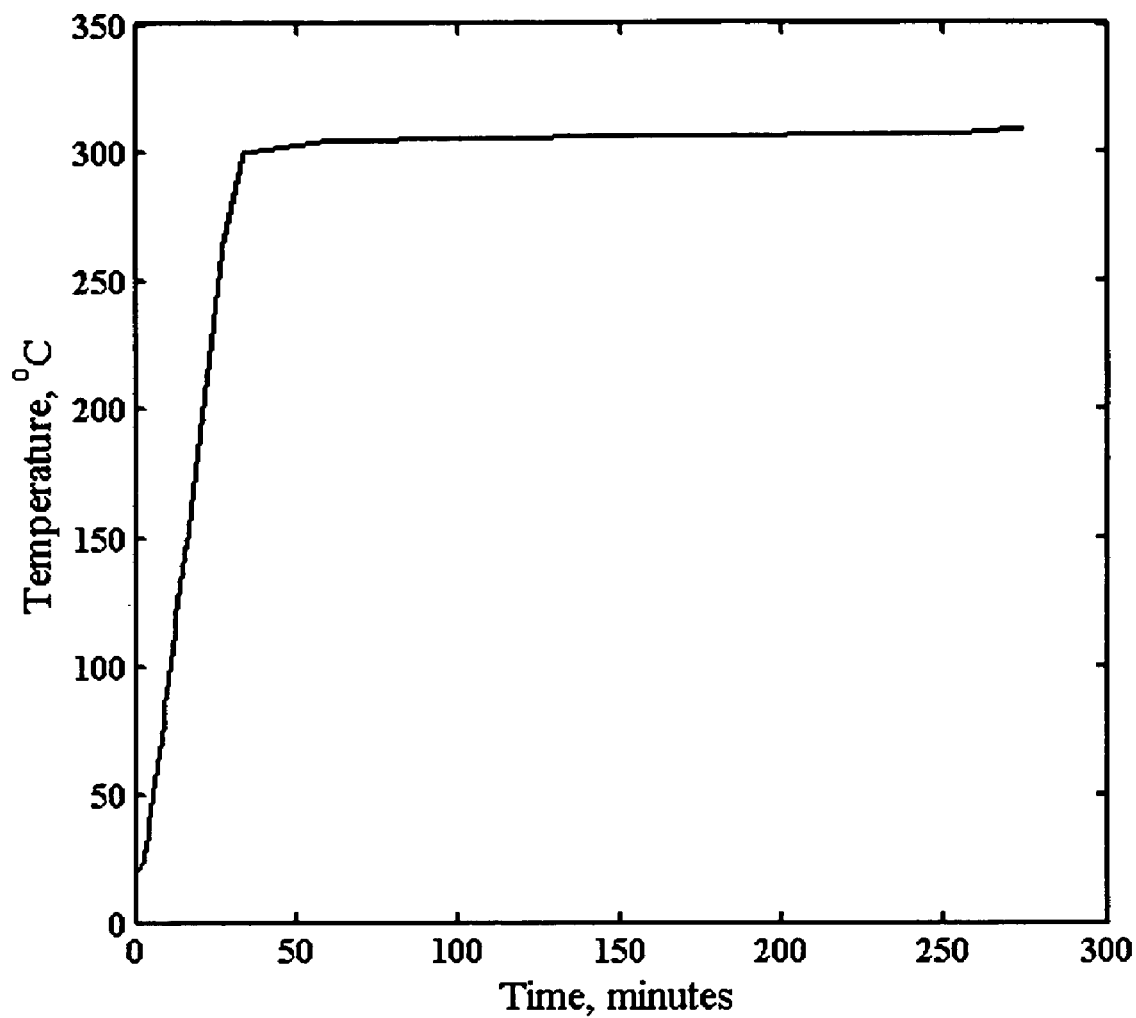
FIG. 7 shows the dependence of temperature of a sample of indanthrone on time.
Figure 8:
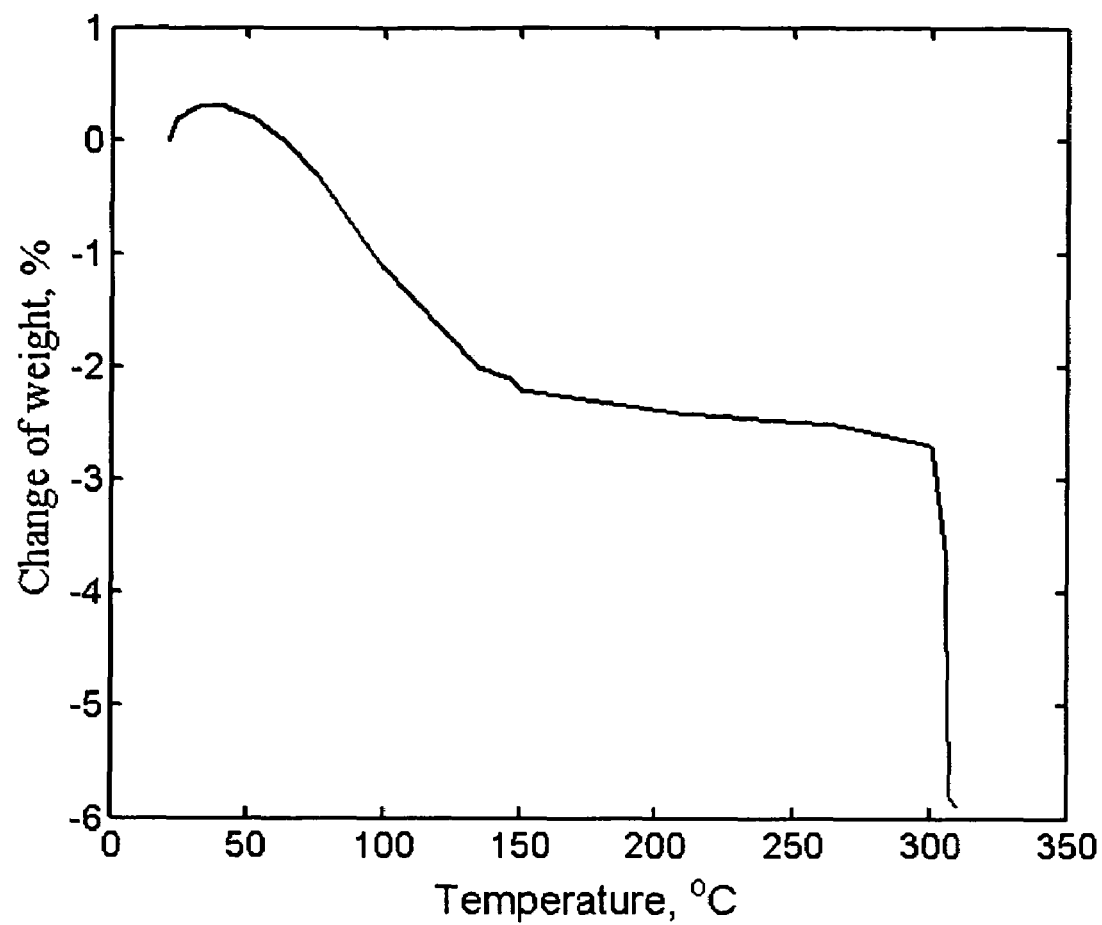
FIG. 8 presents the thermo-analytical curves characterizing variation of the sample weight in the course of heating of a sample of indanthrone when temperature of the sample depends with time as shown in FIG. 7.

Difference between this example and the first example is in a way of realization of external temperature action. In FIG. 6 of the first example it is immediately obvious that the deleting of sulfonic groups starts at temperature of 305 degrees. Therefore it was interesting to find out, whether it is possible to delete from a sample of a conjugated aromatic crystalline layer of at least a part of all sulfonic groups and not to heat up this sample above than 305 degrees. The sample was heated up to temperature of 305 degrees within approximately 60 minutes and then this temperature was supported at this fixed level within 210–220 minutes. The dependence of temperature of conjugated aromatic crystalline layer on time is shown in FIG. 7. The conjugated aromatic crystalline layer was formed by one of the known methods described above. The substrate was a glass plate. The results of measurements performed after drying of the obtained conjugated aromatic crystalline layer confirmed its anisotropic optical properties. Then the conjugated aromatic crystalline layer was subjected to an external thermal action in order to remove sulfonic groups from the organic substance. The sample was heated by a resistive heater in an atmosphere of nitrogen (buffer gas). As a result, of this treatment, at least part of the residual sulfonic groups were removed from the organic substance. FIG. 8 presents the thermo-analytical curves characterizing variation of the sample weight in the course of heating of a sample of indanthrone. As can be seen, long-term thermal external action onto a sample with stationary value of the temperature (305–307° C.) has allowed deleting from a sample at least a part of all sulfonic groups. The removing of ionogenic groups is confirmed by research of their solubility in polar solvents. The solubility of such samples becomes less after their thermal processing in the indicated temperature range.

Figure 9:
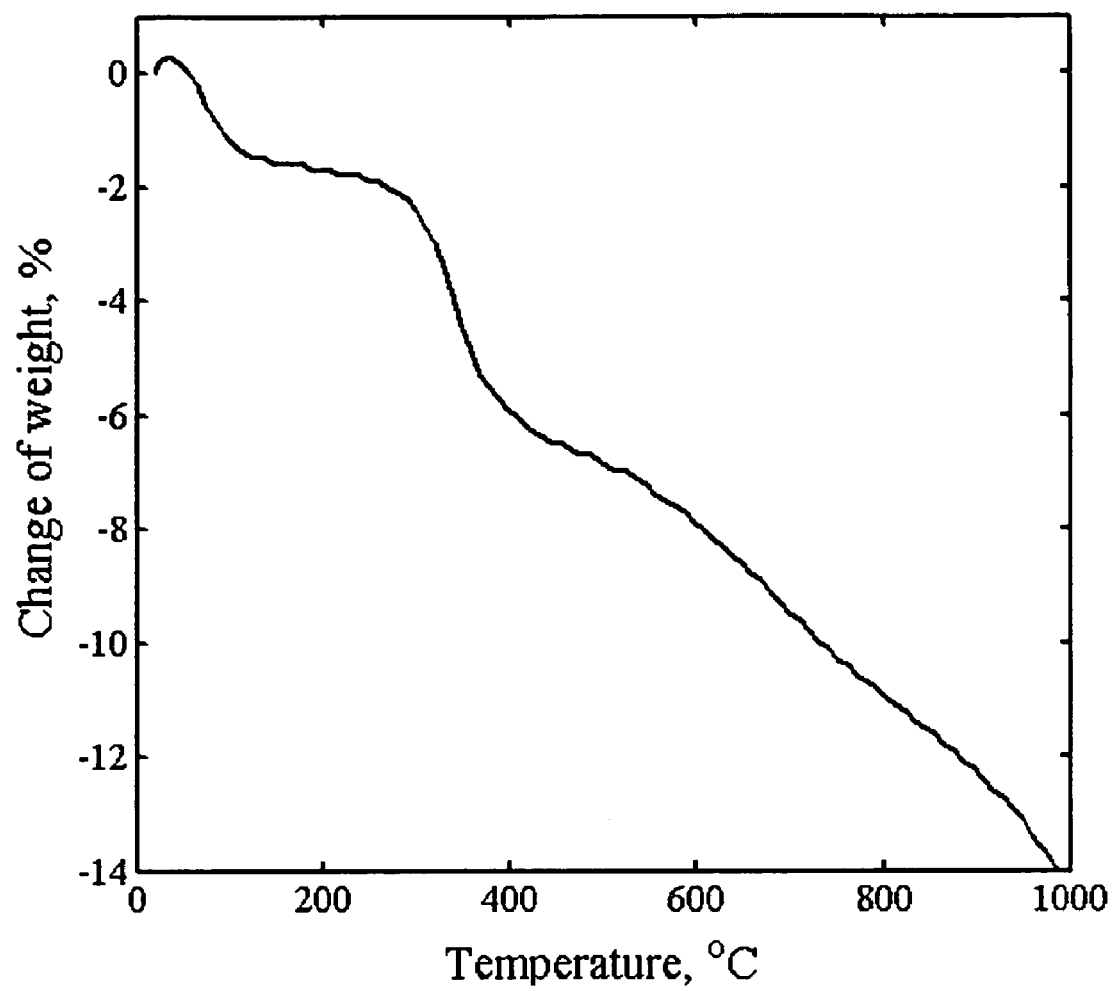
FIG. 9 presents the thermo-analytical curves characterizing variation of the sample weight in the course of heating of a sample of dibenzoimidazol of the perylene-tetracarboxilic acid when the temperature is increased with a constant speed, which is equal to 4.9–5 degrees per minute

In third experimental example an anisotropic film is presented, which formed on a substrate using dibenzoimidazol of perylene-tetracarboxilic acid as an organic compound for the formation of a lyotropic liquid crystal. The conjugated aromatic crystalline layer was formed by one of the known methods described above. The substrate was a glass plate. The results of measurements performed after drying of the obtained conjugated aromatic crystalline layer confirmed its anisotropic optical properties. Then the conjugated aromatic crystalline layer was subjected to an external thermal action in order to remove sulfonic groups from the organic substance. The sample was heated by a resistive heater in an atmosphere of nitrogen (buffer gas). As a result, of this treatment, at least part of the residual sulfonic groups were removed from the organic substance. FIG. 9 presents the thermo-analytical curves characterizing variation of the sample weight in the course of heating of a sample of dibenzoimidazol of perylene-tetracarboxilic acid. The temperature was increased from ambient temperature (20.3° C.) up to 1000° C. with constant speed of increase of temperature, which was equal to 4.8–5 degrees per minute. FIG. 9 shows that heating in the temperature interval from 300 to 400° C. accompanied by intensive variation of the mass of the conjugated aromatic crystalline layer, whereby the measured weight loss corresponds to the mass fraction of sulfonic groups in the organic substance. According to FIG. 9, the temperature of pyrolysis required for the obtaining of an anisotropic film which is optically anisotropic and at least part of which is electrically conducting based on dibenzoimidazol of the perylene-tetracarboxilic acid must be no more than 350° C. The removing of ionogenic groups is confirmed by research of their solubility in polar solvents. The solubility of such samples becomes less after their thermal processing in the indicated temperature range. It should be emphasized that the temperature of external action should be selected as low as possible, since the higher this temperature, the more intensive the degradation processes in the conjugated aromatic crystalline layer material

What is claimed is:

1. A method for obtaining an anisotropic film comprising the steps of:
    providing a substrate,
        depositing by means of Cascade Crystallization Process at least one conjugated aromatic crystalline layer onto said substrate,
        wherein said conjugated aromatic crystalline layer is characterized by
            a globally ordered crystalline structure with an intermolecular spacing of 3.4±0.3 Å in the direction of one of optical axes, and
            formed by rodlike supramolecules, which comprise at least one polycyclic organic compound with a conjugated π-system and ionogenic groups, and
        applying an external action upon at least one deposited conjugated aromatic crystalline layer,
        wherein said external action is characterized by duration, character and intensity which are selected so as to ensure partial removal of ionogenic groups from the conjugated aromatic crystalline layer while retaining the crystalline structure after termination of the external action.

2. The method according to claim 1, wherein the ionogenic groups are selected from the list comprising sulfonic group, COO—, PO4-, cation groups, and carboxy groups.

3. The method according to claim 1, wherein the external action is applied by local or complete heating of said conjugated aromatic crystalline layer up to a temperature of pyrolysis.

4. The method according to claim 1, wherein the external action is applied with use of microwave and/or laser radiation upon at least part of said conjugated aromatic crystalline layer, wherein the frequency of the radiation is in resonance with at least one absorption band of the organic compound.

5. The method according to claim 1, wherein the external action is carried out by a method of two-photon absorption of laser radiation, wherein the sum frequency of two photons of laser radiation is in resonance with at least one absorption band of the organic compound.

6. The method according to claim 1, wherein the external action is local and forms a topological pattern.

7. The method according to claim 6, wherein a part of at least one conjugated aromatic crystalline layer is not subjected to said external action and consequently comprises ionogenic groups, and wherein said part of the conjugated aromatic crystalline layer is further dissolved with use of the polar solvents.

8. The method according to claim 1, wherein immediately after the step of the formation of the conjugated aromatic crystalline layer, further comprise the steps of (i) applying a mask of a material insoluble in polar solvents onto said conjugated aromatic crystalline layer, (ii) removing a part of the conjugated aromatic crystalline layer not covered by the mask by dissolving in a polar solvent, (iii) removing the mask, and (iv) drying.

9. The method according to claim 1, wherein the substrate is made of a material whose temperature of destruction exceeds the temperature to which the substrate is heated in the course of said external action.

10. The method according to claim 1, wherein the substrate is made of one or several materials of the group comprising plastics, glasses, ceramics, metal-ceramic composites, and metals.

11. The method according to claim 1, wherein the substrate is made of a flexible material.

12. The method according to claim 1, wherein the substrate is made of a rigid material.

13. The method according to claim 1, wherein the surface of the substrate is flat, convex, concave, or any combination thereof.

14. The method according to claim 1, wherein at least a part of the substrate surface possesses anisotropic properties, which are caused by either chemical bonds, or relief or texture, which are formed on the substrate surface, and which are made of the substrate material, or of another material.

15. The method according to claim 1, wherein prior to the step of depositing the conjugated aromatic crystalline layer the method further comprises a step of forming at least one alignment layer on said substrate.

16. The method according to claim 15, wherein said alignment layer is deposited on the substrate by oblique deposition of a special material from a gas (vapor) phase.

17. The method according to claim 16, wherein said special material is silicon dioxide.

18. The method according to claim 15, wherein at least one alignment layer is made of a polymer material oriented by rubbing in a certain preset direction.

19. The method according to claim 15, wherein at least one alignment layer is made of a photosensitive polymeric material oriented by exposure to a polarized light.

20. The method according to claim 1, wherein prior to the step of depositing the conjugated aromatic crystalline layer the method further comprises a step of forming at least one polyion layer on said substrate.

21. The method according to claim 20, wherein the polyion layer is positively charged in the course of deposition from an aqueous solution onto the substrate.

22. The method according to claim 21, wherein the substrate is charged negatively in order to attract said polyion layer by means of electrostatic interaction.

23. The method according to claim 21, wherein said conjugated aromatic crystalline layer comprises negatively charged ionogenic groups at the periphery of molecules of organic compounds, whereby at least one of these groups is attracted to said polyion layer.

24. The method according to claim 21, wherein said polyion layer is made of any material selected from the group comprising poly (diallyldimethylammonium chloride), poly (ethyleneimine), and poly (allylamine hydrochloride).

25. The method according to claim 1, wherein prior to the formation of the conjugated aromatic crystalline layer the substrate is covered with an additional layer of a surfactant, which increases adhesion of the adjacent conjugated aromatic crystalline layer to the substrate or to another conjugated aromatic crystalline layer and does not hinder the formation of a liquid crystal phase in said conjugated aromatic crystalline layer.

26. The method according to claim 1, wherein the external action is applied in a buffer gas atmosphere.

27. The method according to claim 26, wherein the buffer gas is any gas selected from the list of inert or interactive gases comprising He, Ar, Xe, $N_2$, and $CO_2$.

28. The method according to claim 1, wherein the organic compound comprises at least one aromatic compound of the general structural formula:

{K}(M)n, where K is a polycyclic organic compound with a conjugated π-system, which comprises one or more ionogenic groups, either like or unlike, ensuring the solubility in polar solvents for the formation of the lyotropic liquid crystal phase; M are modifying functional groups; and n is the number of functional groups.

29. The method according to claim 1, wherein the organic compound comprises at least one polycyclic organic aromatic conjugated compound or a derivative thereof capable of forming the lyotropic liquid crystal phase.

30. The method according to claim 1, wherein the organic compound is based on one material selected from the group comprising indanthrone (Vat Blue 4), 1,4,5,8-perylenetetracarboxylic acid dibenzoimidazole (Vat Red 14), 3,4,9,10-perylenetetracarboxylic acid dibenzoimidazole, quinacridone (Pigment Violet 19), 3,4,9,10-pyrylenetetracarboxylic dianhydride (PTCDA), bis-(1,2,5-thiadiazolo)-p-quinobis-(1,3-dithiol) (BTQBT), and aluminum tris(8-hydroxyquinoline) (Alq3).

31. The method according to claim 1, wherein the organic compound is based on any phthalocyanine or their mixtures selected from the groups comprising metal-free phthalocyanine ($H_2Pc$), $Li_2Pc$, MgPc and phthalocyanines with monovalent or divalent metal; AlClPc, AlOHPc and phthalocyanines with metal halide or a metal hydroxide; TiOPc, $SiCl_2Pc$, $Si(OH)_2Pc$ and phthalocyanines with tetravalent metals; phthalocyanines in which the central ion of metal is replaced or a substitution is made on the sulfonic acid (or amide), carboxylic acid, alkyl, aryl, halide, nitro or other phthalocyanine ring; VOPc, CrPc, FePc, CoPc, NiPc, CuPc, ZnPc, $SnCl_2Pc$, PbPc, $Ge(OH)_2Pc$, and InBrPc.

32. The method according to claim 1, wherein the organic compound is based on one organic compound or their mixtures selected from the group comprising 3,3'-dichlorobenzidine, 2,7-diaminofluorenone, 2,6-diaminoanthraquinone, 2,7-diaminoanthraquinone, (p-aminophenyl) phenylamine, tris(p-aminophenyl)amine, 2,7-diaminodibenzothiophene sulfone, 2,7-diaminodibenzothiophene, 2-(p-aminophenyl)-6-aminobenzoxazole, bis(p-aminophenyl)amine, N-methylbis(p-aminophenyl)amine, 2,5-bis(p-aminophenyl)-1,3,4-oxadiazole, 1,6-diaminopyrene, and 1,5-diaminonaphthalene.

33. The method according to claim 1, wherein the anisotropic film is formed by at least two sequentially formed conjugated aromatic crystalline layers, and wherein the duration, character, and intensity of the external action upon each conjugated aromatic crystalline layer are selected so as to ensure partial removal of ionogenic groups from at least a part of the conjugated aromatic crystalline layer while retaining the crystalline structure of this and preceding conjugated aromatic crystalline layer after termination of the external action.

34. The method according to claim 33, wherein the external action upon each conjugated aromatic crystalline layer is performed by local or complete heating of this conjugated aromatic crystalline layer to a temperature of pyrolysis and wherein the organic compounds of said conjugated aromatic crystalline layer being selected so that the temperature of pyrolysis for each next conjugated aromatic crystalline layer is lower than that of the preceding conjugated aromatic crystalline layer.

35. The method according to claim 33, further comprising an additional external thermal action applied to the anisotropic film, the duration, character, and intensity of which are sufficient for mutual intercalation of organic compounds in at least one pair of adjacent conjugated aromatic crystalline layers.

36. The method according to claim 34, further comprising and additional external thermal action applied to the anisotropic film, the duration, character, and intensity of which are sufficient for the mutual intercalation of organic compounds in at least one pair of adjacent conjugated aromatic crystalline layers.

37. The method according to claim 36, wherein the intercalation temperature is selected below the temperature of pyrolysis of a conjugated aromatic crystalline layer which is last subjected to the external action.

38. The method according to claim 33, further comprising a step of forming at least one polyion layer between said conjugated aromatic crystalline layers.

39. The method according to claim 38, wherein the polyion layers are oppositely charged with respect to the conjugated aromatic crystalline layers.

40. The method according to claim 38, further comprising a step of aligning at least one polyion layer in a certain preset direction prior to the formation of said conjugated aromatic crystalline layer.

41. The method according to claim 40, further comprising a step of aligning at least one of two conjugated aromatic crystalline layers in the same direction as the polyion layer.

42. The method according to claim 33, further comprising a step of aligning the conjugated aromatic crystalline layers in the opposite directions, wherein the alignment directions are opposite for each pair of subsequent conjugated aromatic crystalline layers.

43. The method according to claim 38, wherein the thickness of the polyion layer is approximately equal to the size of the polyion molecule.

* * * * *